United States Patent
Joo et al.

(10) Patent No.: US 10,802,701 B2
(45) Date of Patent: Oct. 13, 2020

(54) VEHICLE INCLUDING TOUCH INPUT DEVICE AND CONTROL METHOD OF THE VEHICLE

(71) Applicant: HYUNDAI MOTOR COMPANY, Seoul (KR)

(72) Inventors: Sihyun Joo, Seoul (KR); Jeong-Eom Lee, Yongin-si (KR); Jungsang Min, Seoul (KR); Gi Beom Hong, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 326 days.

(21) Appl. No.: 14/956,156

(22) Filed: Dec. 1, 2015

(65) Prior Publication Data

US 2017/0068401 A1 Mar. 9, 2017

(30) Foreign Application Priority Data

Sep. 7, 2015 (KR) .......................... 10-2015-0126178

(51) Int. Cl.
*G06F 3/0488* (2013.01)
*G06F 3/0487* (2013.01)
*G06F 3/0481* (2013.01)
*G06F 3/0354* (2013.01)
*B60K 35/00* (2006.01)
(Continued)

(52) U.S. Cl.
CPC .......... *G06F 3/04883* (2013.01); *B60K 35/00* (2013.01); *B60K 37/06* (2013.01); *G06F 3/03547* (2013.01); *G06F 3/0481* (2013.01); *G06F 3/0482* (2013.01); *G06F 3/0487* (2013.01); *G06F 3/04886* (2013.01); *B60K 2370/126* (2019.05); *B60K 2370/143* (2019.05); *G06F 3/041* (2013.01); *G06F 2203/04105* (2013.01); *G06F 2203/04807* (2013.01)

(58) Field of Classification Search
CPC ............. G06F 3/04883; G06F 3/03547; G06F 3/0481; G06F 3/0487; G06F 3/04886
See application file for complete search history.

(56) References Cited

U.S. PATENT DOCUMENTS 6,765,557 B1 * 7/2004 Segal .................... G06F 3/0488
345/173
2006/0279554 A1 * 12/2006 Shin .................... G06F 3/03547
345/173
(Continued)

FOREIGN PATENT DOCUMENTS

JP   2005-216110 A   8/2005
JP   2006-031653 A   2/2006
(Continued)

*Primary Examiner* — Kieu D Vu
*Assistant Examiner* — Roberto Borja
(74) *Attorney, Agent, or Firm* — Morgan, Lewis & Bockius LLP

(57) ABSTRACT

A vehicle includes a display configured to provide a user interface (UI); a touch input device including a concave region for detecting a touch, the concave region being divided into a plurality of subregions in accordance with the UI; a pressure detector configured to detect pressure; and a controller configured to control the display such that the UI is manipulated in accordance with a subregion in which the touch has been detected among the plurality of subregions when the pressure is detected by the pressure detector.

11 Claims, 22 Drawing Sheets

(51) Int. Cl.
*B60K 37/06* (2006.01)
*G06F 3/0482* (2013.01)
*G06F 3/041* (2006.01)

(56) References Cited

U.S. PATENT DOCUMENTS

| | | | |
|---|---|---|---|
| 2007/0152983 A1* | 7/2007 | McKillop | G06F 3/03547 345/173 |
| 2011/0109573 A1* | 5/2011 | Deslippe | G06F 3/044 345/173 |
| 2011/0148762 A1* | 6/2011 | Hatambeiki | G06F 3/0219 345/158 |
| 2013/0147714 A1 | 6/2013 | Xue et al. | |
| 2014/0344767 A1* | 11/2014 | Shimizu | G06F 3/017 715/863 |
| 2015/0041299 A1* | 2/2015 | Suzuki | H01H 3/0213 200/5 A |
| 2015/0286302 A1* | 10/2015 | Kim | H01H 13/705 345/173 |
| 2016/0170507 A1* | 6/2016 | Miller | G06F 3/03547 715/771 |
| 2016/0259496 A1* | 9/2016 | Butcher | G06F 3/0488 |

FOREIGN PATENT DOCUMENTS

| | | |
|---|---|---|
| JP | 2007-164695 A | 6/2007 |
| JP | 4132150 B2 | 8/2008 |
| JP | 2010-202029 A | 9/2010 |
| KR | 20-0263114 Y1 | 2/2002 |
| KR | 10-2009-0074637 A | 7/2009 |

\* cited by examiner

VEHICLE INCLUDING TOUCH INPUT DEVICE AND CONTROL METHOD OF THE VEHICLE

CROSS-REFERENCE TO RELATED APPLICATION

This application claims the benefit of priority to Korean Patent Application No. 10-2015-0126178, filed on Sep. 7, 2015 in the Korean Intellectual Property Office, the entirety of which is incorporated herein by reference.

TECHNICAL FIELD

The present disclosure relates to a vehicle including a touch input device with which a concave region is provided and a control method thereof.

BACKGROUND

As technologies related to vehicles have been developed, various functions providing for the convenience of occupants are being provided besides travelling, which is a basic function performed by vehicles.

As functions that are performable by vehicles are diversified, a manipulation load with respect to a driver's vehicle may increase. The increase in the manipulation load becomes a factor which decreases the driver's concentration on driving and hinders safe driving. In addition, since the difficulty in operation may increase as the number of functions increases, a driver who is inexperienced in manipulating a vehicle may be unable to properly utilize functions performable by the vehicle.

To solve this, studies on a vehicular input device for decreasing a driver's manipulation load and difficulty in operation are being carried out. As a typical example of the vehicular input device, a touch input device which detects a driver's touch exists. The driver can easily control a vehicle by touching the touch input device without a complex operation.

SUMMARY

According to one embodiment of the disclosed invention, a vehicle includes a user interface (UI) which can be controlled in accordance with a position of a user's touch at a time when pressure is applied, and a control method thereof.

According to one embodiment, a vehicle includes: a display for providing a UI; a touch input device in which a concave region for detecting a touch is provided, the concave region being divided into a plurality of subregions in accordance with the UI; a pressure detector for detecting pressure; and a controller for controlling the display such that the UI is manipulated in accordance with the subregion in which the touch has been detected among the plurality of subregions when the pressure is detected by the pressure detector.

The pressure detector may detect the pressure that is applied through the touch input device.

The pressure detector may detect the pressure that is applied in a direction in which the concave region is formed in the touch input device.

At the touch input device, the concave region may be divided into the plurality of subregions corresponding to an object arrangement of the UI provided by the display.

Furthermore, at the touch input device, when the UI provided by the display includes a plurality of objects arranged in a first direction, the concave region may be divided into the plurality of subregions by a boundary line in a second direction which is perpendicular to the first direction.

In addition, in the touch input device, the concave region may be divided into a first subregion in which a detected touch selects a currently activated object in the UI, a second subregion in which a detected touch activates an object disposed in the first direction from the currently activated object in the UI, and a third subregion in which a detected touch activates an object disposed in the opposite direction of the first direction from the currently activated object in the UI.

In addition, in the touch input device, when the UI provided by the display includes a plurality of objects arranged to surround a reference point, the concave region may be divided into the plurality of subregions by a boundary line passing through the center of the concave region.

In addition, in the touch input device, the concave region may be divided into a plurality of subregions which detect touches respectively selecting the plurality of objects in the UI.

In addition, the controller may transmit, to the display, a control command corresponding to the subregion in which a touch has been detected.

In addition, the display may manipulate the provided UI in accordance with the received control command.

According to another embodiment, a control method of a vehicle which includes a touch input device in which a concave region for detecting a touch is provided includes: providing a user interface (UI); dividing the concave region into a plurality of subregions in accordance with the UI; detecting pressure; detecting a touch at the concave region when the pressure is detected; and manipulating the UI in accordance with a subregion in which the touch has been detected among the plurality of subregions.

In addition, the detecting of the pressure may include detecting the pressure applied through the touch input device.

In addition, the detecting of the pressure may include detecting the pressure applied in a direction in which the concave region is formed in the touch input device.

In addition, the dividing of the concave region into the plurality of subregions in accordance with the UI may include dividing the concave region into the plurality of subregions in accordance with an object arrangement of the provided UI.

In addition, when the UI includes a plurality of objects arranged in a first direction, the dividing of the concave region into the plurality of subregions in accordance with the UI may include dividing the concave region into the plurality of subregions by a boundary line in a second direction which is perpendicular to the first direction.

In addition, the dividing of the concave region into the plurality of subregions in accordance with the UI may include dividing the concave region into a first subregion in which a detected touch selects a currently activated object in the UI, a second subregion in which a detected touch activates an object disposed in the first direction from the currently activated object in the UI, and a third subregion in which a detected touch activates an object disposed in the opposite direction of the first direction from the currently activated object in the UI.

In addition, when the provided UI includes a plurality of objects arranged to surround a reference point, the dividing of the concave region into the plurality of subregions in accordance with the UI may include dividing the concave region into the plurality of subregions by a boundary line passing through the center of the concave region.

In addition, the dividing of the concave region into the plurality of subregions in accordance with the UI may include dividing the concave region into the plurality of subregions which detect touches respectively selecting the plurality of objects in the UI.

In addition, the manipulating of the UI in accordance with the subregion in which the touch has been detected among the plurality of subregions may include: generating a control command corresponding to the subregion in which the touch has been detected; and manipulating the UI in accordance with the control command.

BRIEF DESCRIPTION OF THE DRAWINGS

These and/or other aspects of the invention will become apparent and more readily appreciated from the following description of the embodiments, taken in conjunction with the accompanying drawings.

DETAILED DESCRIPTION

Hereinafter, a vehicle and a control method thereof will be described in detail with reference to the accompanying drawings.

Figure 1:
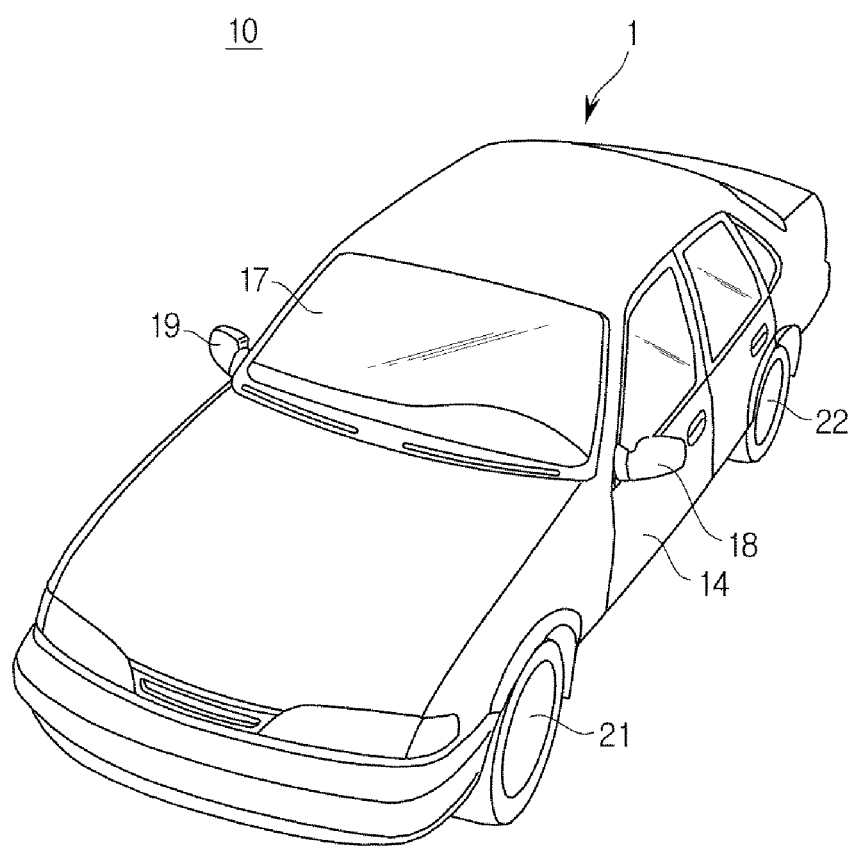
FIG. 1 is a view illustrating an exterior of a vehicle according to an embodiment.

FIG. 1 is a view illustrating an exterior of a vehicle according to an embodiment.

As shown in FIG. 1, a vehicle according to an embodiment includes a main body 10 forming an exterior of a vehicle 1, wheels 21 and 22 for moving the vehicle 1, doors 14 for covering an inner portion of the vehicle 1 from the outside, a front glass 17 for providing a view in front of the vehicle 1 to a driver in the vehicle 1, and side mirrors 18 and 19 for providing a view behind the vehicle 1 to the driver.

The wheels 21 and 22 include front wheels 21 provided at a front portion of the vehicle, and rear wheels 22 provided at a rear portion of the vehicle, and the front wheels 21 or the rear wheels 22 may receive a rotational force from a driving device and move the main body 10 forward or backward.

The doors 14 are rotatably provided at left and right sides of the main body 10 to enable the driver to get into the vehicle 1 when opened, and cover the inner portion of the vehicle 1 from the outside when closed.

The front glass 17 is provided at a front upper portion of the main body 10 to enable the driver in the vehicle 1 to obtain visual information in front of the vehicle 1, and may also be called a windshield.

In addition, the side mirrors 18 and 19 include a left side mirror 18 provided at a left side of the main body 10, and a right side mirror 19 provided at a right side of the main body 10, and enable the driver in the vehicle 1 to obtain visual information at the side of and behind the vehicle 1.

Figure 2:
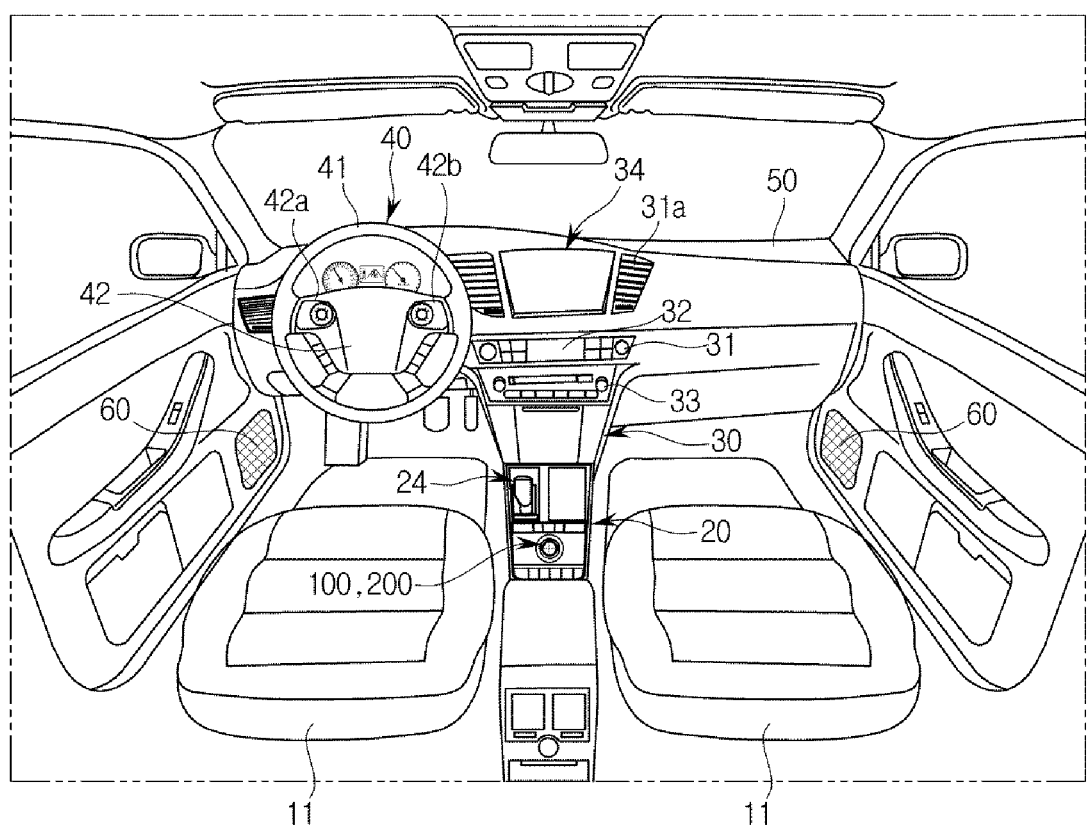
FIG. 2 is a view illustrating an inner configuration of the vehicle according to an embodiment.

FIG. 2 is a view illustrating an inner configuration of the vehicle according to an embodiment.

As shown in FIG. 2, the vehicle 1 may include seats 11 on which the driver, and passenger sit, a gearbox 20, a dashboard 50 including a center fascia 30, and a steering wheel 40, and a speaker 60.

A gear shift 24 for changing the gears of the vehicle 1, and touch input devices 100 and 200 for controlling the performance of the functions of the vehicle 1 may be installed at the gearbox 20. The touch devices will be described below.

The steering wheel 40 provided at the dashboard 50 is a device for adjusting a traveling direction of the vehicle 1, and may include a rim 41 for gripping by a driver, and a spoke 42 connected to a steering device of the vehicle 1 and connecting the rim 41 to a hub of a rotary shaft for steering. In accordance with an embodiment, operation devices 42a and 42b for controlling various types of devices, e.g. an audio device, etc. in the vehicle 1 may be formed at the spoke 42.

An air conditioning device 31, a clock 32, an audio device 33, and a display, etc. may be installed at the center fascia 30 provided at the dashboard 50.

The air conditioning device 31 adjusts temperature, humidity, air quality, and air flow in the vehicle 1 to keep the inner portion of the vehicle 1 pleasant. The air conditioning device 31 may include at least one outlet 31a installed at the center fascia 30 to discharge air. A button or dial, etc. for controlling the air conditioning device 31, etc. may be installed at the center fascia 30. An occupant such as a driver may use the button disposed at the center fascia 30 to control the air conditioning device 31.

The clock 32 may be provided near the button or dial for controlling the air conditioning device 31.

The audio device 33 may include an operation panel at which a plurality of buttons for performing a function of the audio device 33 are provided. The audio device 33 may provide a radio mode which provides a radio function, and a media mode which plays audio files of various storage media in which the audio files are stored.

The display 34 may provide a UI which provides information related to the vehicle 1 in a form of an image or text to the driver. For this, the display 34 may be embedded in the center fascia 30. However, an example of installing the display is not limited thereto, and the display may be provided to be separable from the center fascia 30 of the vehicle 1. A detailed operation of the display will be described below.

Here, the display 34 may be realized by a liquid crystal display (LCD), a light emitting diode (LED), a plasma display panel (PDP), an organic light emitting diode (OLED), and a cathode ray tube (CRT), etc., but is not limited thereto.

In addition, the dashboard 50 may further include various types of dashboards capable of displaying a travel speed, engine RPMs, or remaining fuel, etc. of the vehicle 1 and a glove box capable of storing various types of objects, etc.

The speaker 60 capable of outputting a sound may be provided in the vehicle 1. The speaker may output information related to the vehicle 1 as a sound. For example, when the vehicle 1 receives an output signal which controls to output a recommended travel method, the speaker 60 may output the recommended travel method corresponding to the output signal through sound to inform an occupant.

Meanwhile, the vehicle may provide a UI to a driver through the display, and the UI may be manipulated in accordance with a control command input by the driver through the touch input devices mentioned above. Hereinafter, a UI operation method of the vehicle according to an embodiment will be described with reference to FIG. 3.

Figure 3:
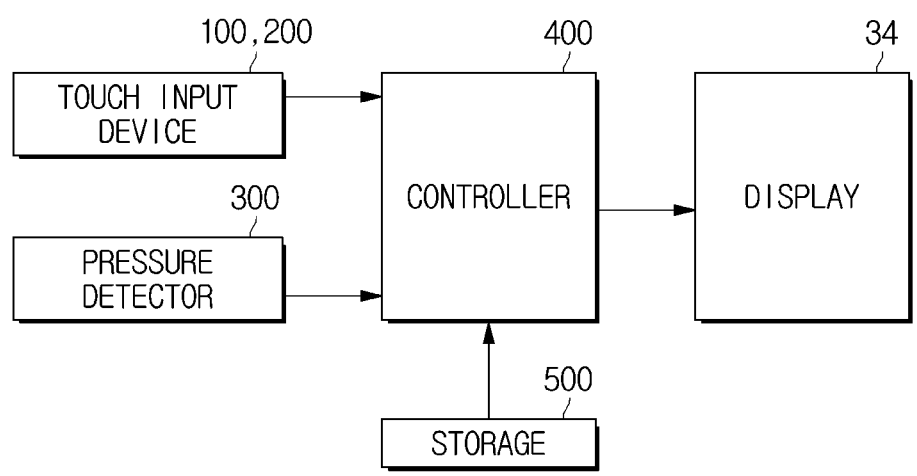
FIG. 3 is a control block diagram of the vehicle according to an embodiment.

FIG. 3 is a control block diagram of an embodiment in the disclosure.

To manipulate a UI, the vehicle may include touch input devices 100 and 200 for detecting a touch; a pressure detector 300 for detecting pressure; the display 34 for providing the UI; a storage 500 in which a control command corresponding to the touch and the pressure is stored; and a controller 400 for controlling the display 34 so that the UI being provided is manipulated in accordance with the touch and the pressure.

The touch input devices may detect a touch of an occupant including a driver. For this, a concave region may be provided inward in the touch input devices, and a touch may be detected in the concave region.

Hereinafter, various embodiments of the touch input devices will be described with reference to FIGS. 4A to 7.

Figure 4A:
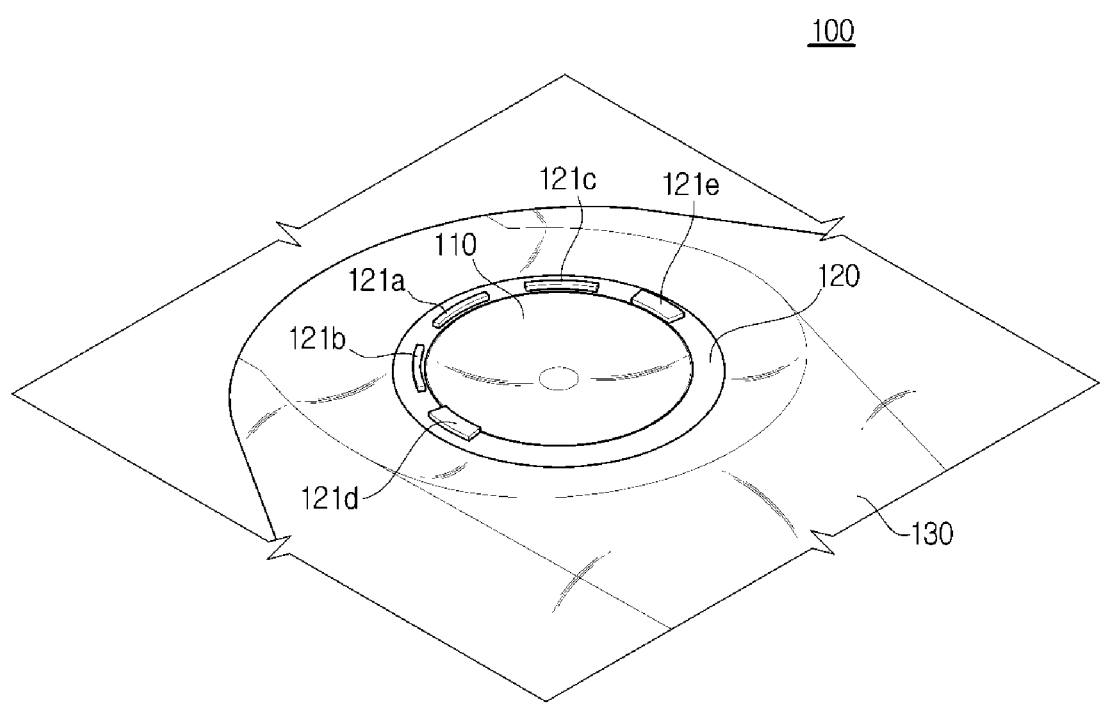
FIG. 4A is a perspective view of a touch input device according to an embodiment.
Figure 4B:
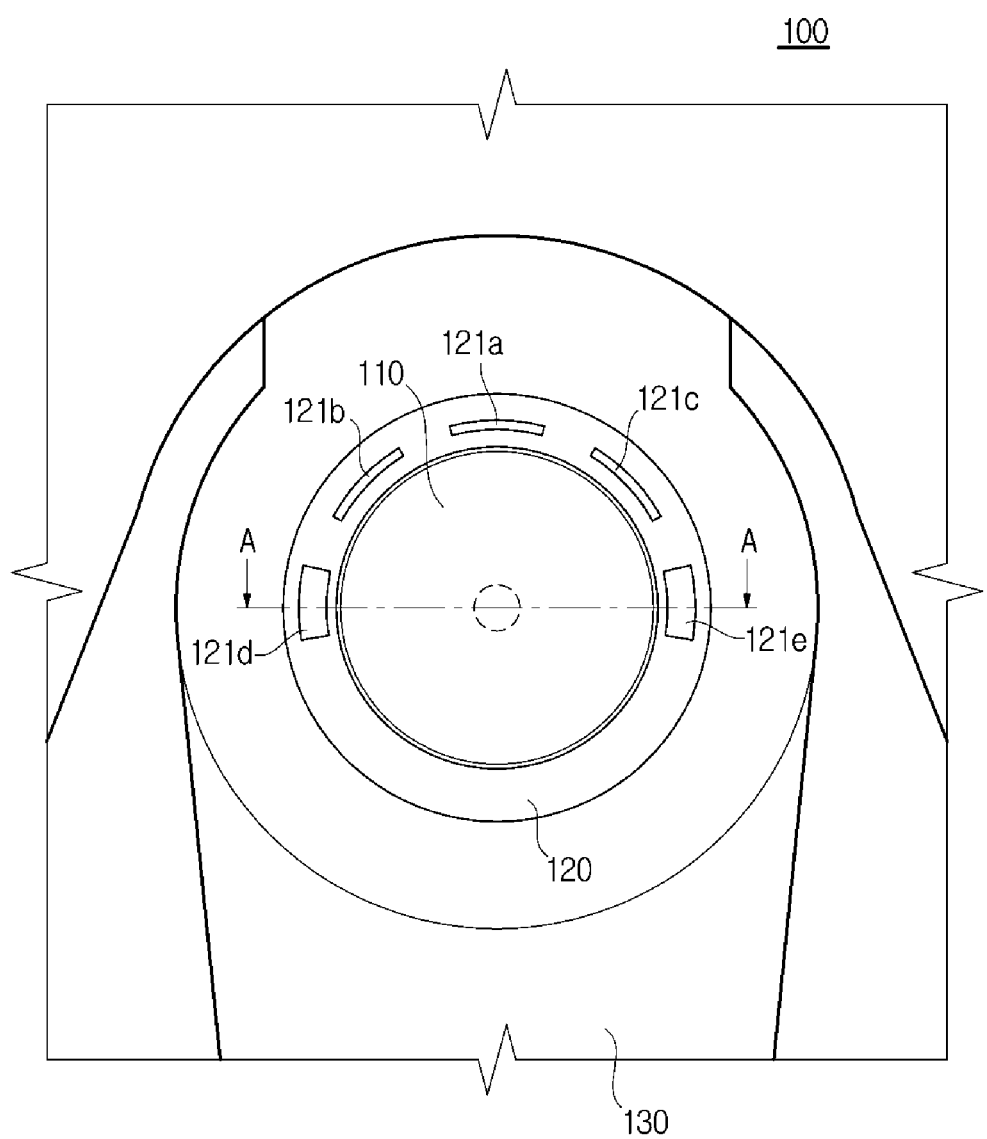
FIG. 4B is a plan view of the touch input device according to an embodiment.
Figure 4C:
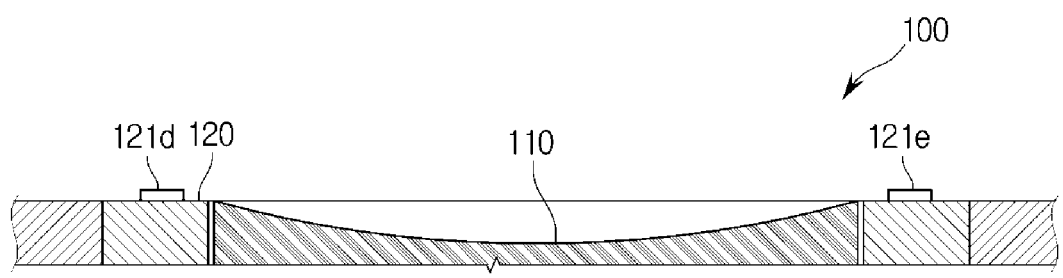
FIG. 4C is a cross-sectional view of the touch input device according to an embodiment, taken along the line A-A in FIG. 4b.

FIG. 4A is a perspective view of a touch input device according to an embodiment, FIG. 4B is a plan view of the touch input device according to an embodiment, and FIG. 4C is a cross-sectional view of the touch input device according to an embodiment, taken along the line A-A in FIG. 4B.

A touch input device disclosed in FIGS. 4A to 4C includes a touch portion 110 capable of detecting an occupant's touch, and an edge portion 120 which surrounds the touch portion 110.

The touch portion 110 may be a touch pad at which a signal is generated when an occupant comes in contact with or near the touch pad using a pointer such as a finger or touch pen, etc. The occupant may input a touch gesture to the touch portion 110 and input a desired control command.

Despite its name, the touch pad may include a touch film or touch sheet, etc. which includes a touch sensor. In addition, the touch pad may include a touch panel which is the display 34 with a touchable screen.

Meanwhile, recognizing a position of a pointer while the pointer is near the touch pad without coming in contact with the touch pad is called a "proximity touch," and recognizing the position of the pointer when the pointer comes in contact with the touch pad is called a "contact touch." Here, a position at which the proximity touch occurs may be a position at which the pointer is perpendicular to the touch pad when the pointer is near the touch pad.

The touch pad may use a resistive film method, an optical method, a capacitance method, an ultrasonic wave method, or a pressure method, etc. In other words, various well-known touch pads may be used.

The edge portion 120 represents a portion which surrounds the touch portion 110, and may be provided as a separate member from the touch portion 110. Key buttons or touch buttons 121a, 121b, 121c, 121d, and 121e which surround the touch portion 110 may be disposed at the edge portion 120. In other words, the occupant may input a control command by a touch at the touch portion 110, and input the control command using the buttons 121a, 121b, 121c, 121d, and 121e which are provided at the edge portion 120 around the touch portion 110.

The disclosed touch input device may further include a wrist supporter 130 for supporting an occupant's wrist. Here, the wrist supporter 130 may be disposed higher than the touch portion 110. This may prevent the wrist from being twisted when the occupant touches the touch portion 110 by a finger while resting the wrist on the wrist supporter 130. Consequently, a musculoskeletal disease of the occupant may be prevented and a more comfortable feeling of manipulation may be provided.

The touch portion 110 may include a portion which is lower than a boundary line with the edge portion 120. In other words, a touch surface of the touch portion 110 may be disposed lower than the boundary line of the touch portion 110 and the edge portion 120. For example, the touch surface may be provided to be inclined downward from the boundary line with the edge portion 120, or disposed at a different height from the boundary line with the edge portion 120. For example, the touch portion 110 according to an embodiment in FIG. 4C may include a curved portion including a concavely curved region.

The touch portion 110 includes the portion which is lower than the boundary line with the edge portion 120, thereby the occupant can recognize a region and boundary of the touch portion 110 by touch. At the touch input device, a touch detection rate may become higher at a central portion of the touch portion 110. In addition, the occupant may intuitively recognize the region and boundary of the touch portion 110 by touch when inputting a touch, thereby the occupant may input a touch at an accurate position, and accuracy of a touch input may be improved as a result.

The touch portion 110 may include a concave region. Here, "concave" refers to a recessed or depressed shape, and may not only include a rounded recessed shape but also include an obliquely or stepwise recessed shape.

Referring to FIG. 4C, the touch portion 110 may include a concavely curved region. Here, the curved surface of the touch portion 110 may be provided with different curvatures. For example, a curvature at a central portion of the curved surface may be provided to be small (meaning that a radius of curvature is large), and a curvature at an outer edge portion of the curved surface may be provided to be large (meaning that a radius of curvature is small).

The touch portion 110 includes the curved surface, thereby a feeling of touch (or feeling of manipulation) felt by the occupant when inputting a touch may increase. The curved surface of the touch portion 110 may be provided similar to a trajectory drawn by a motion of a fingertip when a person moves his or her finger while his or her wrist is fixed, or rotates or twists the wrist while the finger is spread out.

In addition, the touch portion 110 may be provided in a circular shape. It may be easy to form the concavely curved region when the touch portion 110 is provided in the circular shape. In addition, since the occupant is able to detect a touch region of the circular touch portion 110 by touch as the touch portion 110 is provided in the circular shape, the occupant may easily input rolling or spinning motions.

In addition, as the touch portion 110 is provided with the curved surface, the occupant is able to intuitively recognize a position on the touch portion 110 at which his or her finger is placed. As the touch portion 110 is provided with the curved surface, slopes vary at every point on the touch portion 110. Consequently, the occupant may intuitively recognize the position on the touch portion 110 at which his or her finger is placed through a sense of slope felt by his or her finger. This feature provides feedback with respect to the position on the touch portion 110 at which his or her finger is placed when the occupant inputs a gesture at the touch portion 110 while having his or her eyes fixed to places other than the touch portion 110, thereby assisting the occupant in inputting a desired gesture, and improving accuracy in inputting the gesture.

Different from FIGS. 4A to 4C, the concave region of the touch input device may be divided into a central portion and an outer edge portion. Hereinafter, a case in which the concave region of the touch input device is divided into a gesture input at the central portion and a swiping input at the outer edge portion will be described in detail with reference to FIGS. 5A to 5C.

Figure 5A:
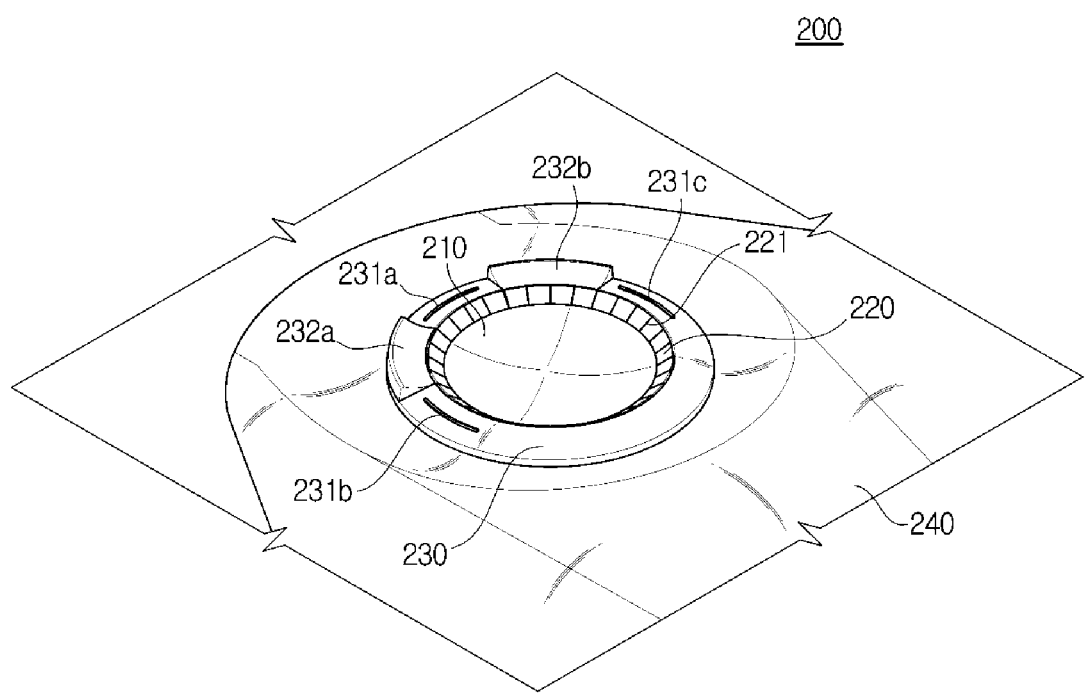
FIG. 5A is a perspective view of a touch input device according to another embodiment.
Figure 5B:
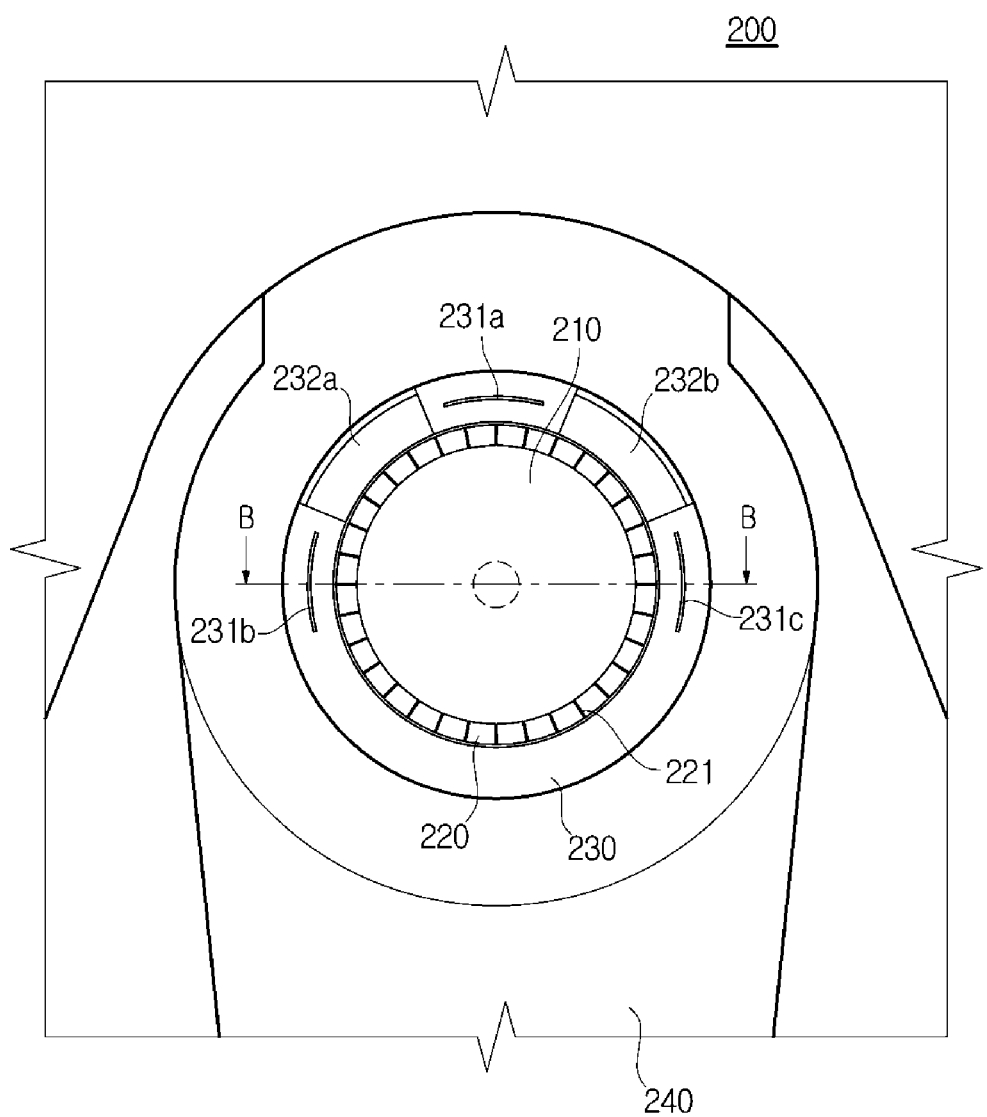
FIG. 5B is a plan view of the touch input device according to another embodiment.
Figure 5C:
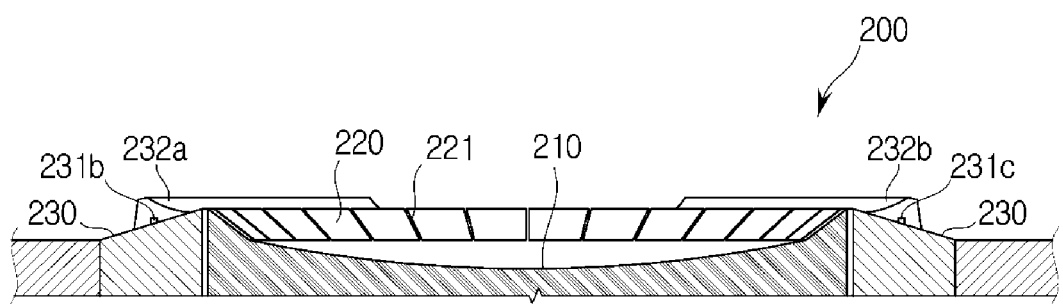
FIG. 5C is a cross-sectional view of the touch input device according to another embodiment, taken along the line B-B in FIG. 5b.

FIG. 5A is a perspective view of a touch input device according to another embodiment, FIG. 5B is a plan view of the touch input device according to another embodiment, and FIG. 5C is a cross-sectional view of the touch input device according to another embodiment, taken along the line B-B in FIG. 5B.

A touch input device 200 in FIGS. 5A to 5C includes touch portions 210 and 220 capable of detecting an occupant's touch, and an edge portion 230 surrounding the touch portions 210 and 220.

A method in which the touch portion detects a touch is the same as that of the embodiment in FIGS. 4A to 4C.

The edge portion 230 represents a portion which surrounds the touch portions 210 and 220, and may be provided as a separate member from the touch portions 210 and 220. Key buttons 232a and 232b or touch buttons 231a, 231b, and 231c which surround the touch portions 210 and 220 may be disposed at the edge portion 230. In other words, the occupant is able to input a gesture at the touch portions 210 and 220, and use the buttons 231a, 231b, 231c, 232a, and 232b provided at the edge portion 230 around the touch portions 210 and 220 to input a signal.

In addition, as the embodiment in FIGS. 4A to 4C, the touch input device 200 may further include a wrist supporter 240 which is disposed at a lower portion of a gesture input means to support an occupant's wrist.

Referring to FIG. 5C, the touch portions 210 and 220 may include a portion which is lower than a boundary line with the edge portion 230. In other words, touch surfaces of the touch portions 210 and 220 may be disposed lower than the boundary line of the touch portions 210 and 220 and the edge portion 230. For example, the touch surfaces may be provided to be inclined downward from the boundary line with the edge portion 230, or disposed at a different height from the boundary line with the edge portion 230. Meanwhile, as shown in FIG. 5C, the touch portions 210 and 220 include a gesture input 210 which is formed in a concavely curved shape.

The fact that the touch portions 210 and 220 may include a concave region is the same as the embodiment in FIGS. 4A to 4C.

The touch portions 210 and 220 according to another embodiment of the present invention may include a swiping input 220 provided to be inclined downward along an outer edge of the gesture input 210. When the touch portions 210 and 220 are provided in a circular shape, the gesture input 210 may be formed in a shape of a partial spherical surface, and the swiping input 220 may be provided to surround a circumference of the gesture input 210.

The swiping input 220 may detect a swiping gesture. For example, an occupant may input a swiping gesture in accordance with the swiping input 220 provided in the circular shape. The occupant is able to input the swiping gesture clockwise or counterclockwise in accordance with the swiping input 220.

The swiping input 220 may include gradations 221. The gradations 221 may visually or tactually inform the occupant of a relative position of his or her finger. For example, the gradations 221 may be embossed or engraved. The gradations 221 may be disposed at intervals. Consequently, the occupant is able to intuitively recognize a number of gradations 221 along which his or her finger passes while swiping, thereby precisely adjusting a length of the swiping gesture.

As an embodiment, a cursor displayed on the display 34 may move in accordance with the number of gradations 221 along which the finger passes during the swiping gesture. When various options to be selected are consecutively disposed on the display 34, an option which is selected every time the occupant's finger passes along one of the gradations 221 while swiping may be moved sideward by one space.

A slope of the swiping input 220 according to an embodiment in FIGS. 5A to 5C may be provided to be greater than a tangential slope of the gesture input 210 at a boundary at which the swiping input 220 and the gesture input 210 intersect. As the slope of the swiping input 220 is provided steeper than the slope of the gesture input 210 when the occupant inputs a gesture at the gesture input 210, the occupant may intuitively feel the gesture input 210. Meanwhile, a touch may not be recognized at the swiping input 220 while the gesture is being input at the gesture input 210. Consequently, even when the occupant touches the boundary with the swiping input 220 while inputting the gesture at the gesture input 210, a gesture input at the gesture input 210 and a swiping gesture input at the swiping input 220 may not overlap.

As the touch portions 210 and 220, the gesture input 210 and the swiping input 220 may be integrally formed. Meanwhile, a touch sensor may be separately provided at the gesture input 210 and the swiping input 220, or integrally provided as one touch sensor. When one touch sensor is integrally provided at the gesture input 210 and the swiping input 220, the controller differentiates a touch region of the gesture input 210 from a touch region of the swiping input 220, such that a signal by a touch at the gesture input 210 may be differentiated from a signal by a touch at the swiping input 220.

The touch input device 200 may further include the button input means 231a, 231b, 231c, 232a, and 232b. The button input means 231a, 231b, 231c, 232a, and 232b may be disposed near the touch portions 210 and 220. The button input means 231a, 231b, 231c, 232a, and 232b may include touch buttons 231a, 231b, and 231c capable of performing a designated function by an occupant's touch, or pressing buttons 232a and 232b capable of performing a designated function while having positions thereof changed by an external force applied by the occupant.

A case in which the touch portion is divided into the swiping input having a slope and the gesture input of a curved shape was described in FIGS. 5A to 5C. Hereinafter, a touch input device including a touch portion which is realized in accordance with still another embodiment will be described.

Figure 6:
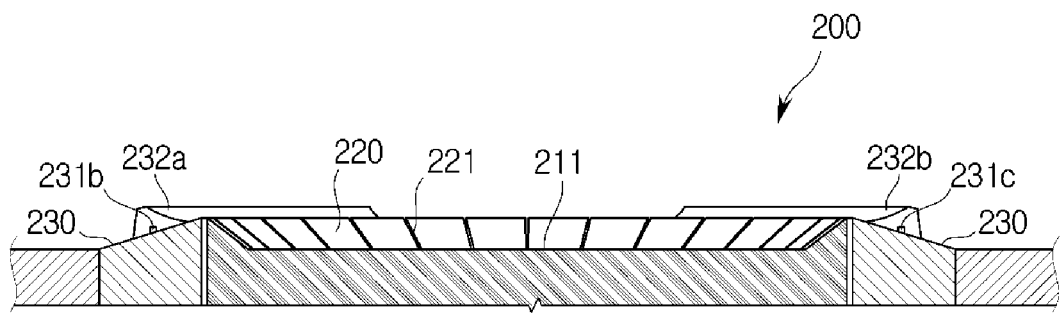
FIGS. 6 and 7 are cross-sectional views of a touch input device according to various embodiments.
Figure 7:
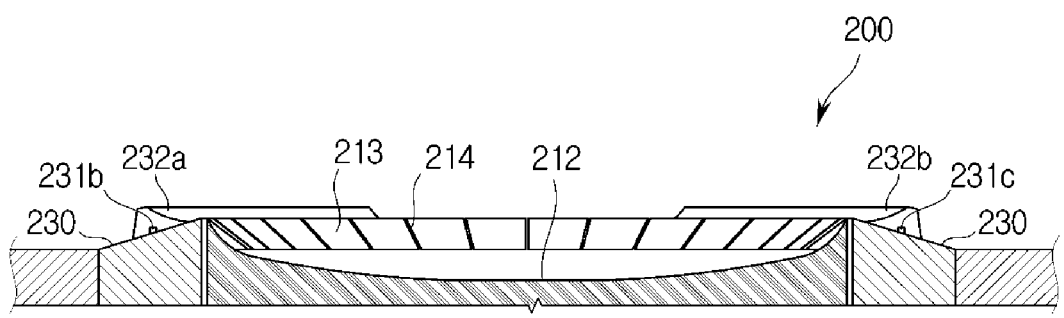

FIGS. 6 and 7 are cross-sectional views of a touch input device according to various embodiments.

Referring to FIG. 6, as the touch portions 210 and 220 according to yet another embodiment, the gesture input 210 may be provided in a flat shape, and the swiping input 220 may be provided to be inclined downward. As the gesture input 210 is disposed lower than outer portions of the touch portions 210 and 220 and the boundary line of the touch portions 210 and 220, a user may intuitively recognize a touch region.

In addition, as the swiping input 220 having a slope is provided at the touch portions, the occupant may easily input the swiping gesture.

Referring to FIG. 7, as the touch portions 210 and 220 according to yet another embodiment, the gesture input 210 and the swiping input 220 are formed with consecutive curved surfaces. Here, the curvature of the swiping input 220 is provided to be greater than the curvature of the gesture input 210. Accordingly, the user may differentiate the swiping input 220 from the gesture input 210 even while not having his or her eyes fixed to the touch portions 210 and 220 by detecting a sudden change in the curvature.

Hereinafter, for convenience of description, it will be assumed that the touch input device is realized as the embodiment in FIGS. 5A and 5C.

Referring again to FIG. 3, the pressure detector 300 is able to detect the pressure applied by an occupant.

Figure 8A:
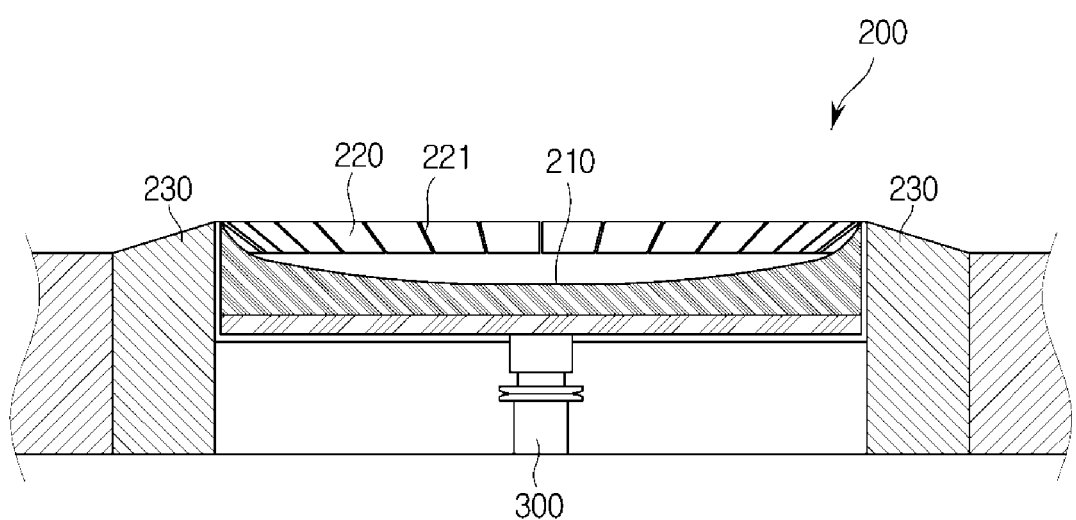
FIGS. 8A and 8B are views for describing positions at which a pressure detector is provided according to various embodiments.
Figure 8B:
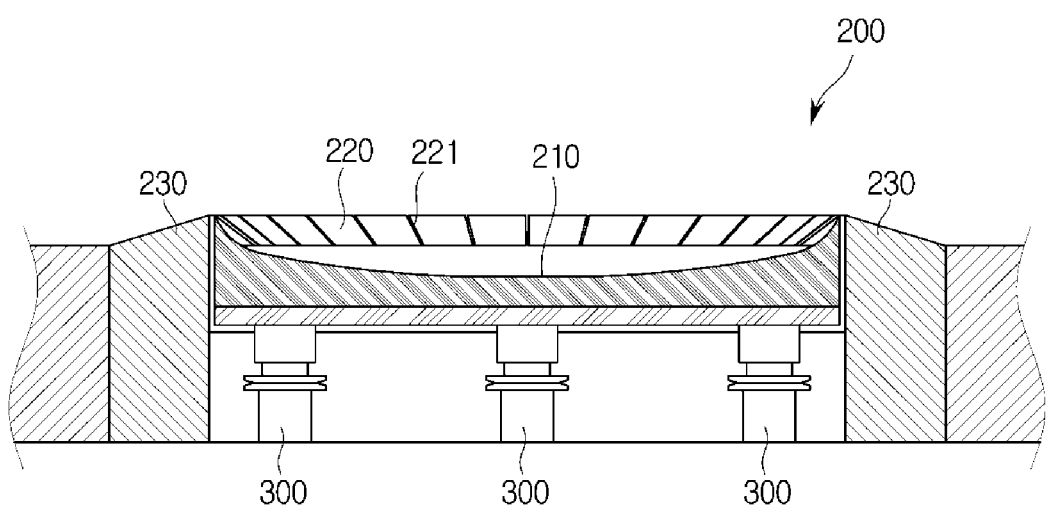

FIGS. 8A and 8B are views for describing positions at which a pressure detector is provided according to various embodiments.

Referring to FIG. 8A, the pressure detector 300 may be provided at a rear surface of the touch portions 210 and 220, i.e. the concave region, of the touch input device 200. An occupant may touch and press the touch portions 210 and 220 at the same time. In other words, pressure may be applied to the touch input device 200 in a direction in which the touch portions 210 and 220 are concavely formed. As a result, the touch portions 210 and 220 may move in a direction in which the pressure is applied, and the pressure detector 300 provided at the rear surface of the touch portions 210 and 220 may detect the pressure applied to the touch portions 210 and 220.

Although a case in which one pressure detector 300 is provided is illustrated in FIG. 8A, a plurality of pressure detectors 300 may be provided as illustrated in FIG. 8B.

The pressure detector 300 may be able to detect only whether a pressure equal to or greater than a critical value has been applied, or may also be able to measure a magnitude of the applied pressure.

Though the pressure detector 300 is provided at a rear surface of the touch portions 210 and 220 in FIGS. 8A and 8B to sense the pressure applied to the pressure detector 300, the shape or the position of the pressure detector 300 is not limited thereto and the pressure detector 300 may be implemented with various pressure sensors.

The controller 400 may control a UI provided by the display 34 based on a touch detected in the touch input device 200 and pressure detected in the pressure detector 300.

Specifically, the controller 400 may divide the touch portions 210 and 220, i.e. the concave region, at the touch input device 200 into a plurality of subregions based on the provided UI. Then, the controller 400 may control the UI in accordance with a subregion in which a touch is detected among the plurality of subregions, when the pressure is detected.

Hereinafter, a specific operation of the controller 400 will be described with reference to FIGS. 9, 10A, and 10B.

Figure 9:
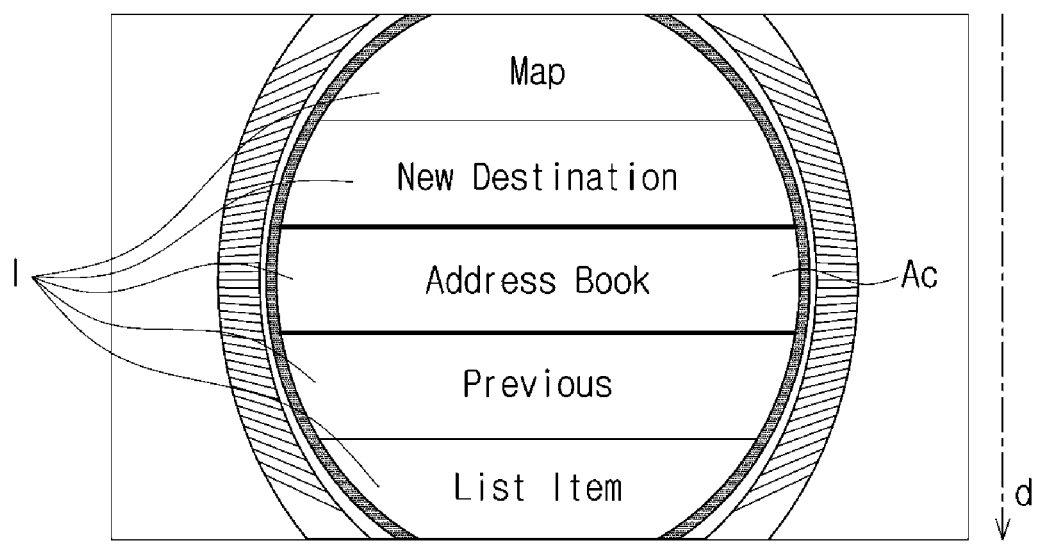
FIG. 9 is a view for illustrating a UI provided by a display according to an embodiment.
Figure 10A:
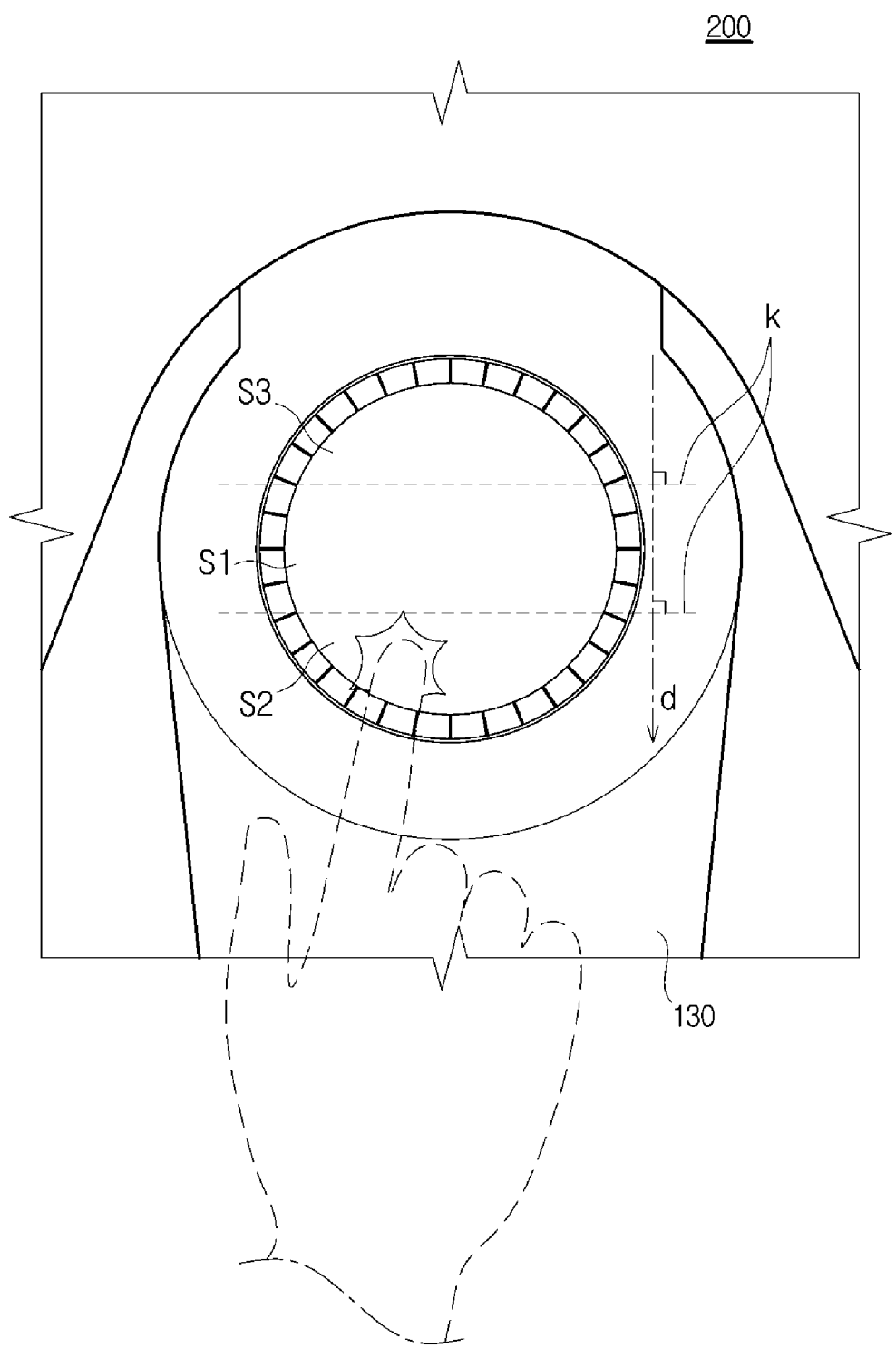
FIGS. 10A and 10B are views for describing an operation of a controller according to an embodiment.
Figure 10B:
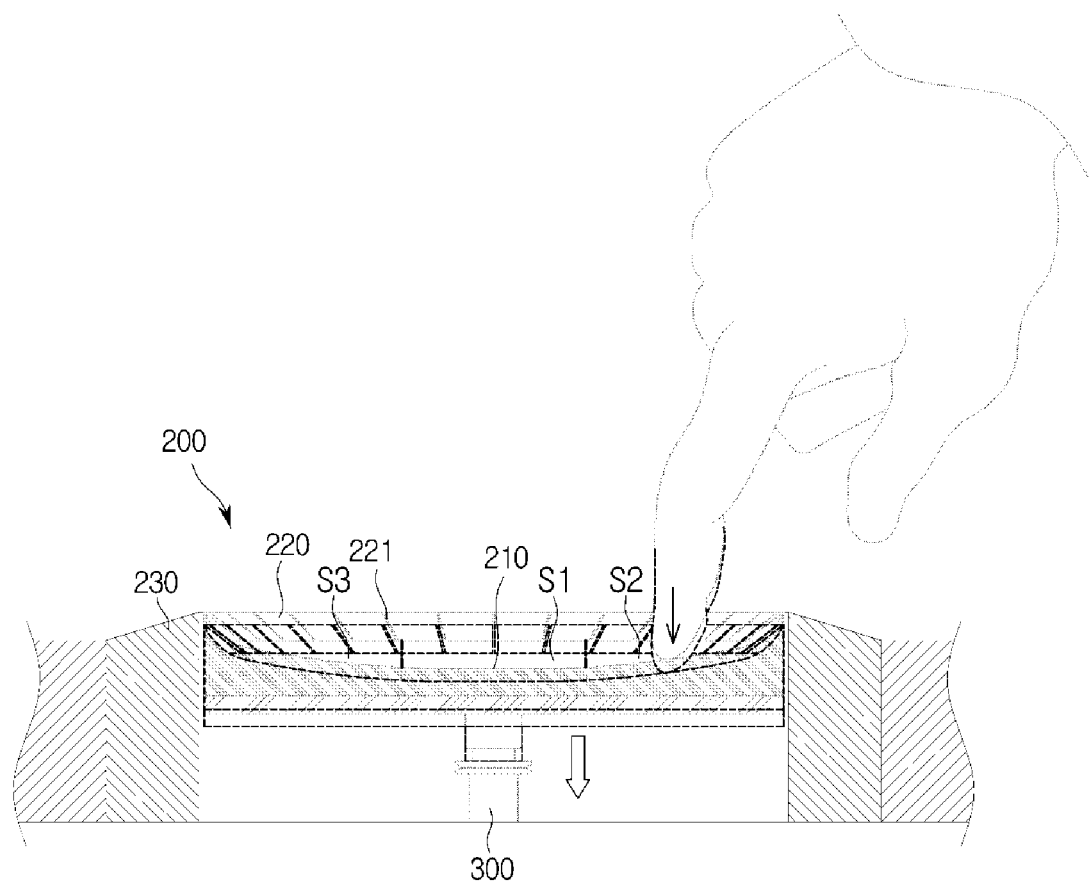

FIG. 9 is a view for illustrating a UI provided by a display according to an embodiment, and FIGS. 10A and 10B are views for describing an operation of a controller according to an embodiment. A direction of an arrow d in FIGS. 9 and 10A is a top-to-bottom direction.

As mentioned above, the display 34 may provide a UI for providing information related to a vehicle. Here, the provided UI may include a plurality of objects I, and the plurality of objects may represent every object that may be selected by an occupant's input. As an embodiment, the object may include an icon which executes an application when selected, a folder including the icon which executes the application when selected, and a top-level folder including a subfolder.

FIG. 9 is illustrating a UI related to navigation, and the plurality of objects I are arranged from top to bottom. In addition, a shaded object Ac among the plurality of objects I may signify that it has been activated to a selectable state.

The controller 400 may divide the touch portions 210 and 220, i.e. the concave region, of the touch input device 200 corresponding to the UI in FIG. 9.

FIG. 10A is a plan view of the touch input device 200 in FIGS. 5A to 5C, and FIG. 10B is a vertical cross-sectional view of the touch input device 200 in FIGS. 5A to 5C.

Corresponding to the UI in which the plurality of objects I are arranged from top to bottom, the controller 400 may divide the concave region of the touch input device 200 into the plurality of subregions using a left-to-right boundary line which is perpendicular to the top-to-bottom direction. Here, there may be one or more boundary lines, and FIGS. 10A and 10B are illustrating a case in which there are two boundary lines.

Using the two boundary lines, the controller 400 may divide the concave region of the touch input device 200 into three subregions. Specifically, the controller 400 may divide the concave region into a first subregion in which a detected touch selects a currently activated object Ac, a second subregion in which a detected touch activates an object I disposed in the top-to-bottom direction from the currently activated object Ac, and a third subregion in which a detected touch activates an object I disposed in a bottom-to-top direction, which is opposite from the top-to-bottom direction, from the currently activated object Ac.

Then, when the pressure is detected, the controller 400 may control the display 34 so that the UI is manipulated in accordance with a subregion in which a touch has been detected. In other words, when an occupant touches and presses the concave region at the same time and the pressure detector 300 detects this, the controller 400 may manipulate the UI in accordance with the subregion in which the touch has been detected.

FIGS. 10A and 10B are illustrating a case in which the occupant touches and presses a second subregion at the same time. Since pressure is detected in the pressure detector 300 and a touch is detected in the second subregion at the same time, the controller 400 may control the display 34 to activate "Previous" object I which is disposed in the top-to-bottom direction from a currently activated "Address Book" object Ac.

So far, the operation of the controller 400 was described with the assumption of the UI in which the plurality of objects I are arranged in the top-to-bottom direction. Hereinafter, the operation of the controller 400 with an assumption of a UI in which the plurality of objects I are arranged in a left-to-right direction will be described with reference to FIGS. 11, 12A, and 12B.

Figure 11:
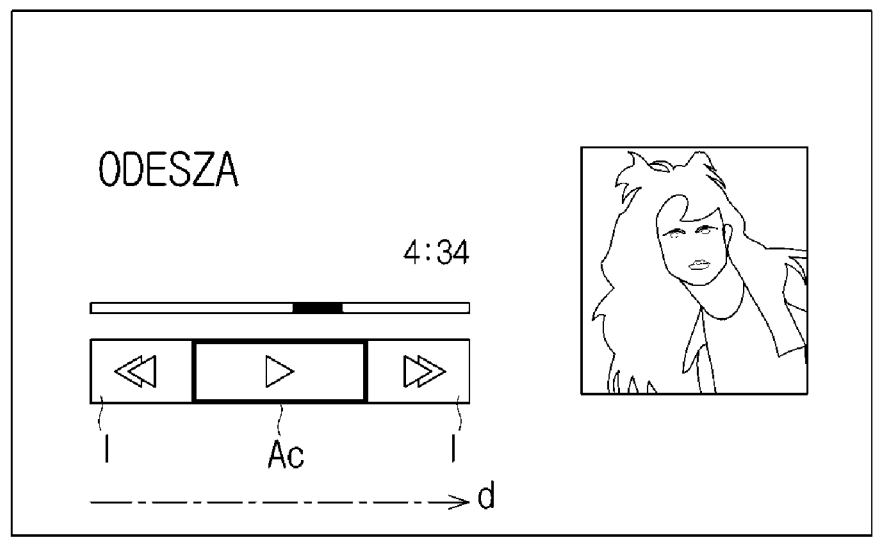
FIG. 11 is a view illustrating a UI provided by a display according to another embodiment.
Figure 12A:
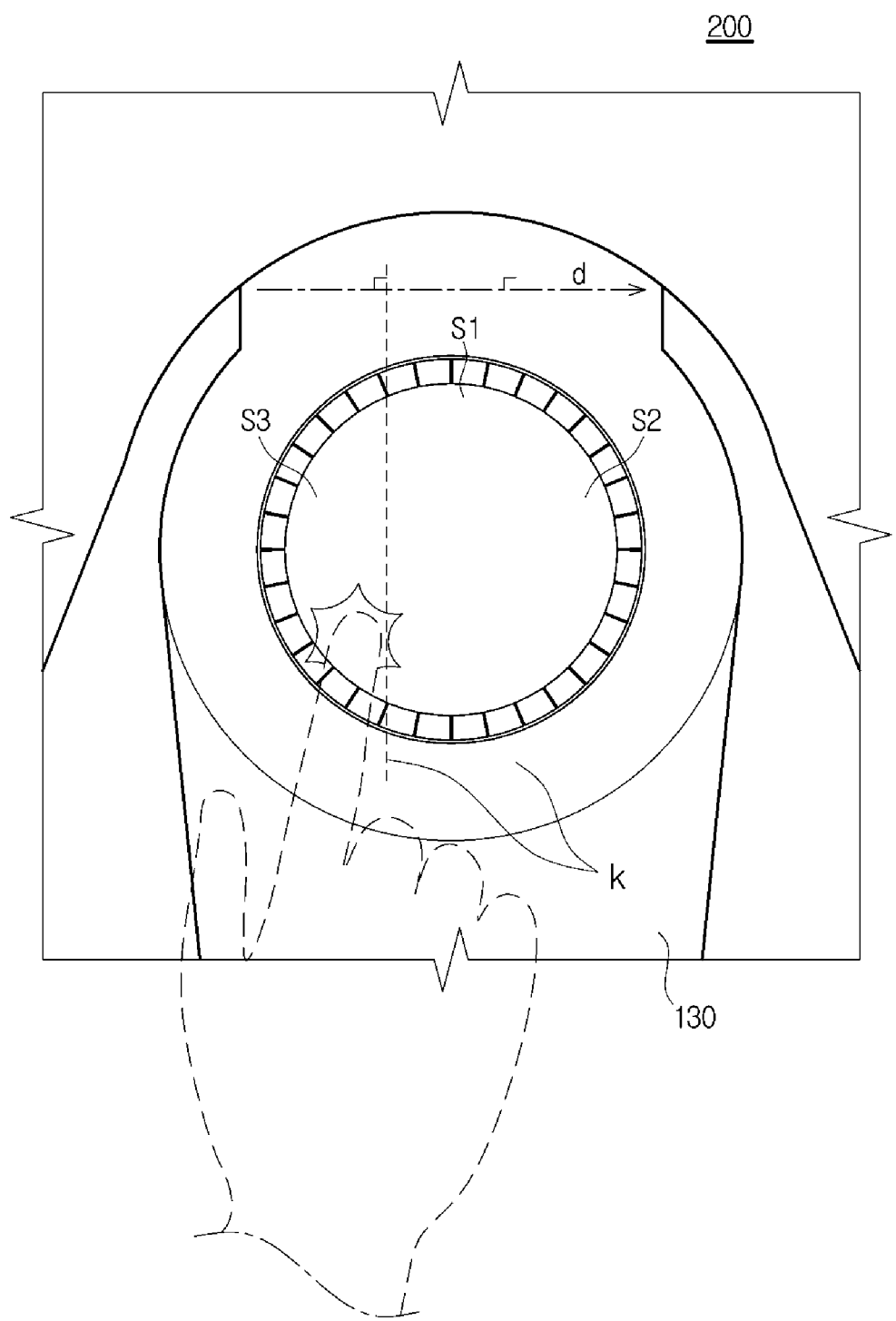
FIGS. 12A and 12B are views for describing an operation of a controller according to another embodiment.
Figure 12B:
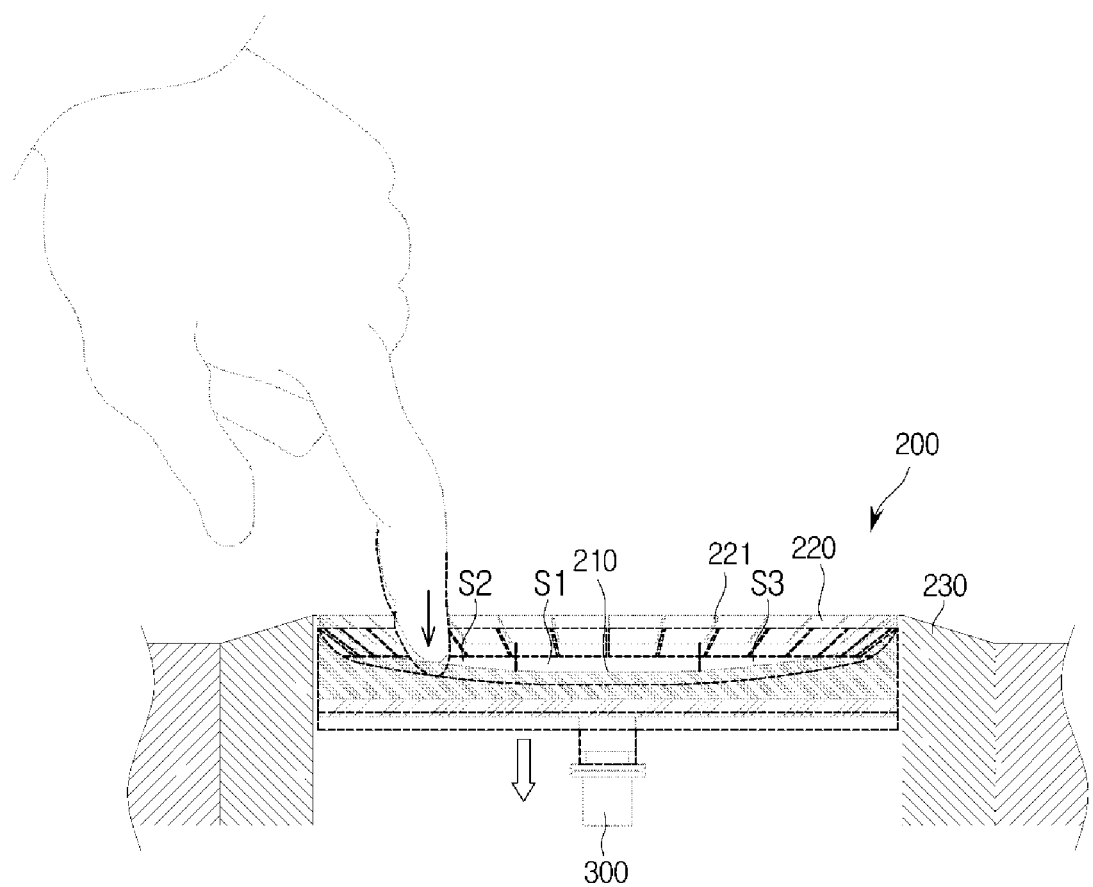

FIG. 11 is a view illustrating a UI provided by a display according to another embodiment, and FIGS. 12A and 12B are views for describing an operation of a controller according to another embodiment. A direction of an arrow d in FIGS. 11 and 12A is a left-to-right direction.

FIG. 11 is illustrating a UI related to playing music, and rewind, play, fast forward objects I are consecutively arranged from the left in the left-to-right direction. In addition, a "play" object Ac whose boundary is emphasized with a bold line among the plurality of objects I may signify that it has been activated to a selectable state.

The controller 400 may divide the touch portions 210 and 220, i.e. the concave region, of the touch input device 200 corresponding to the UI in FIG. 11.

FIG. 12A is a plan view of the touch input device 200 in FIGS. 5A to 5C, and FIG. 12B is a left-to-right cross-sectional view of the touch input device 200 in FIGS. 5A to 5C.

Corresponding to the UI in which the plurality of objects I are arranged from left to right, the controller 400 may divide the concave region of the touch input device 200 into the plurality of subregions using a top-to-bottom boundary line which is perpendicular to the left-to-right direction. Here, there may be one or more boundary lines, and FIGS. 12A and 12B are illustrating a case in which there are two boundary lines.

Using the two boundary lines, the controller 400 may divide the concave region of the touch input device 200 into three subregions. Specifically, the controller 400 may divide the concave region into a first subregion in which a detected touch selects a currently activated object Ac, a second subregion in which a detected touch activates an object I disposed in the left-to-right direction from the currently activated object Ac, and a third subregion in which a detected touch activates an object I disposed in a right-to-left direction, which is opposite from the left-to-right direction, from the currently activated object Ac.

Then, when the pressure is detected, the controller 400 may control the display 34 so that the UI is manipulated in accordance with a subregion in which a touch has been detected. In other words, when an occupant touches and presses the concave region at the same time and the pressure detector 300 detects this, the controller 400 may manipulate the UI in accordance with the subregion in which the touch has been detected.

FIGS. 12A and 12B are illustrating a case in which the occupant touches and presses a third subregion at the same time. Since pressure is detected in the pressure detector 300 and a touch is detected in the third subregion at the same time, the controller 400 may control the display 34 so as to activate the "rewind" object I which is disposed in the right-to-left direction from the currently activated "play" object Ac.

So far, the operation of the controller 400 has been described with the assumption that the UI in which the plurality of objects I are arranged in a straight direction. Hereinafter, the operation of the controller 400 with an assumption that a UI in which the plurality of objects I are arranged in a circular or oval shape will be described with reference to FIGS. 13A and 13B.

Figure 13A:
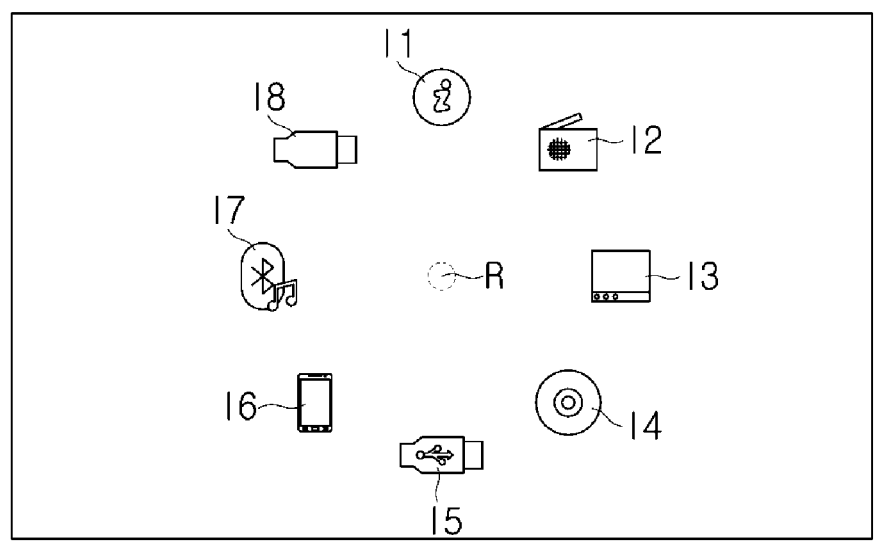
FIG. 13A is a view for illustrating a UI provided by a display according to still another embodiment.
Figure 13B:
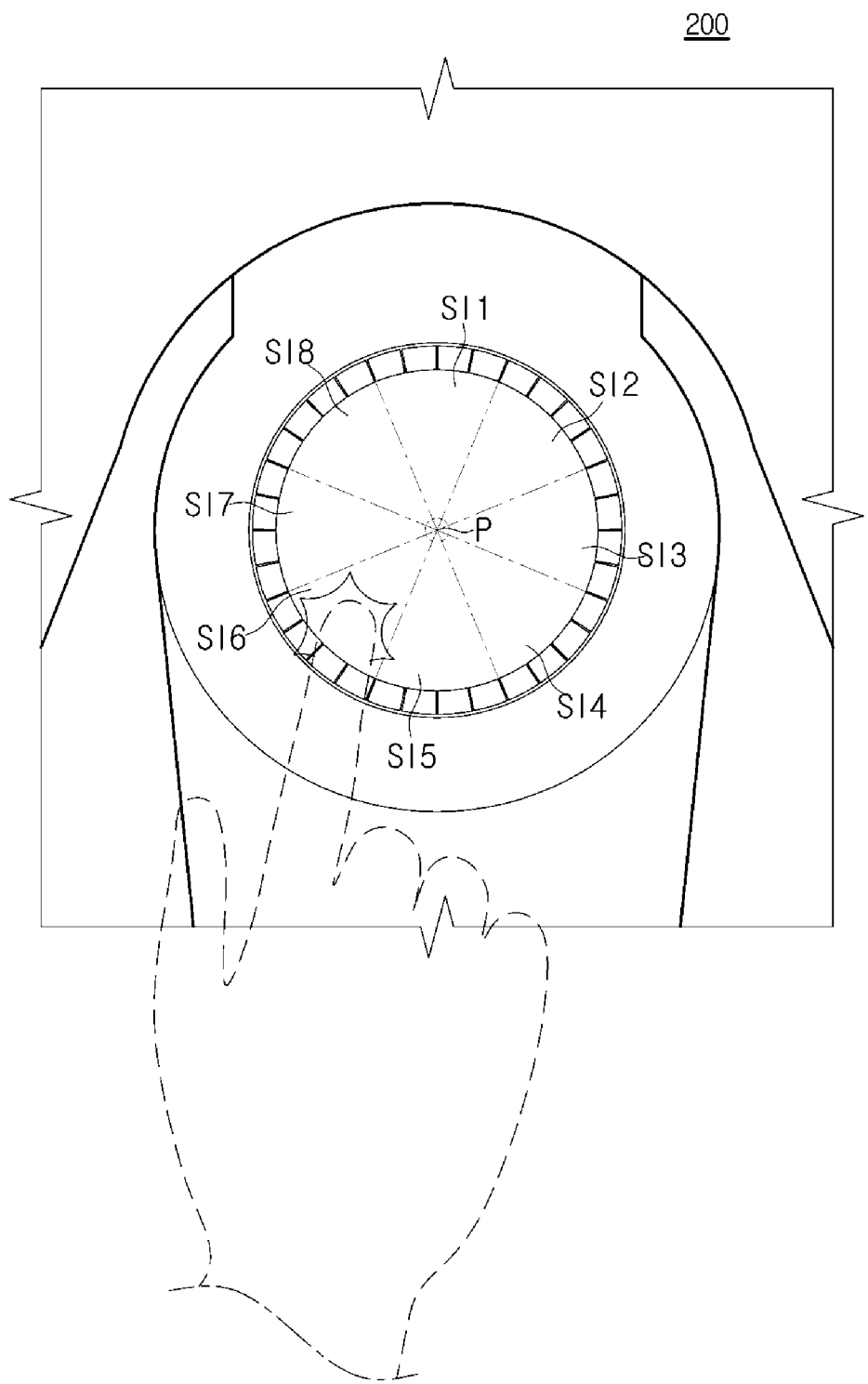
FIG. 13B is a view for describing an operation of a controller according to still another embodiment.

FIG. 13A is a view for illustrating a UI provided by a display according to still another embodiment, and FIG. 13B is a view for describing an operation of a controller according to still another embodiment.

FIG. 13A illustrates a case in which the plurality of objects I are arranged to surround a reference point R. Here, the reference point R may be when manufacturing a vehicle, and may be a central point of the whole UI.

The controller 400 may divide the touch portions 210 and 220, i.e. the concave region, of the touch input device 200 corresponding to the UI in FIG. 13A. FIG. 13A is a plan view of the touch input device 200 in FIGS. 5A to 5C.

Corresponding to the UI in which the plurality of objects I are arranged to surround the reference point R, the controller 400 may divide the concave region into the plurality of subregions by a boundary line passing through the center P of the concave region. Here, there may be one or more boundary lines, and FIG. 13B is illustrating a case in which there are four boundary lines.

Using the four boundary lines, the controller 400 may divide the concave region of the touch input device 200 into eight subregions. Specifically, the controller 400 may divide the concave region into a first subregion in which a detected touch selects a first object 11, a second subregion in which a detected touch selects a second object 12, . . . , and an eighth subregion in which a detected touch selects an eighth object 18.

Then, when the pressure is detected, the controller 400 may control the display 34 so that the UI is manipulated in accordance with a subregion in which a touch has been detected. In other words, when an occupant touches and presses the concave region at the same time and the pressure detector 300 detects this, the controller 400 may manipulate the UI in accordance with the subregion in which the touch has been detected.

FIG. 13B is illustrating a case in which the occupant touches and presses a sixth subregion at the same time. Since pressure is detected in the pressure detector 300 and a touch is detected in the sixth subregion at the same time, the controller 400 may control the display 34 to display a sixth object 16 corresponding to the sixth subregion that has been selected.

The controller 400 may control the display 34 by transmitting a control command corresponding to the subregion in which the touch has been detected to the display 34 when the pressure is detected. Here, the controller 400 may transmit the control command to the display 34 with reference to a corresponding relation between the subregion and the control command which is prestored in the storage 500.

The display 34 may manipulate the provided UI in accordance with the received control command.

The storage 500 may be implemented using at least one type selected from the group consisting of a flash memory, a hard disk drive, a multimedia card micro memory, a card-type memory (e.g., secure digital (SD) card or an extreme digital (XD) card memory), a random access memory (RAM), a static random access memory (SRAM), a read only memory (ROM), an electrically erasable programmable read only memory (EEPROM), a programmable read only memory (PROM), a magnetic memory, a magnetic disc, and an optical disc.

The controller 400 may be implemented as an integrated circuit in a microprocessor. As another example, the controller 400 may be implemented as software such as firmware. Also, the controller 400 may be implemented as a separate chip.

Figure 14:
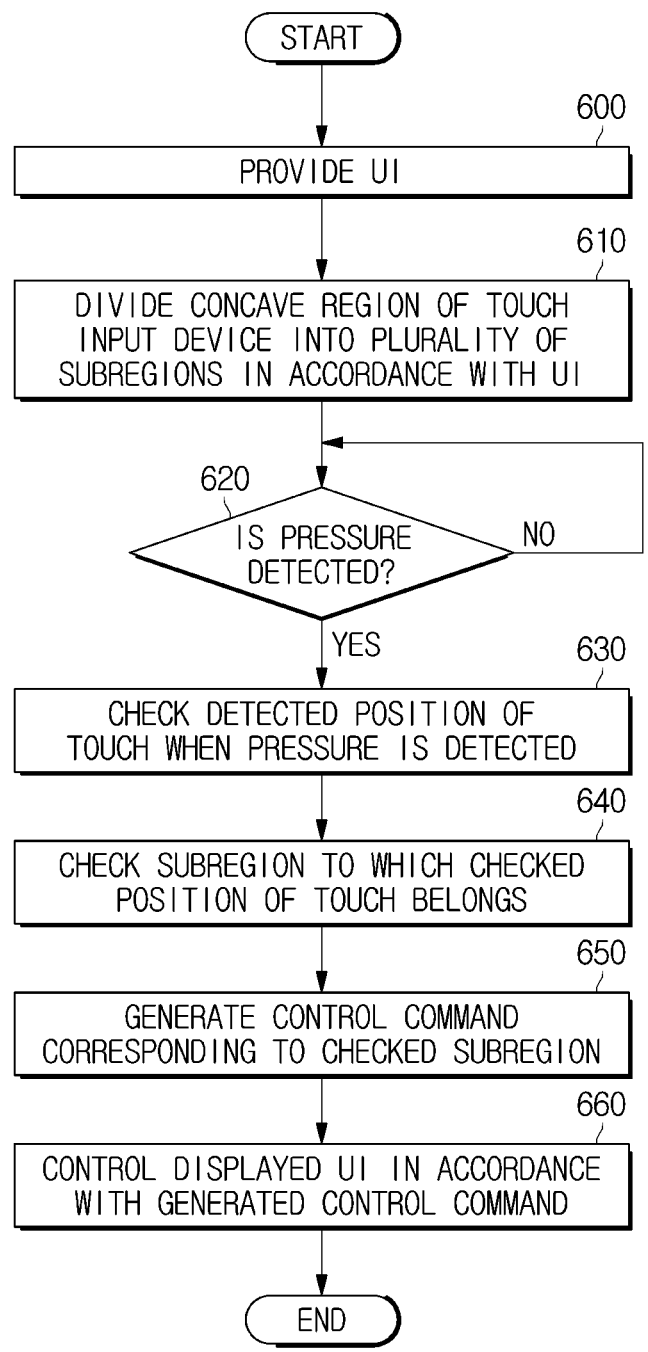
FIG. 14 is a flow chart of a control method of the vehicle according to an embodiment.

FIG. 14 is a flow chart of a control method of the vehicle according to an embodiment.

First, the display 34 of the vehicle may provide a UI (600). The provided UI may include a plurality of objects I. Here, the plurality of objects I may represent every object that may be selected by an occupant's input. As an embodiment, the object I may include an icon which executes an application when selected, a folder including the icon which executes the application when selected, and a top-level folder including a subfolder.

The plurality of objects I may be arranged in accordance with a method. For example, the plurality of objects I may be arranged in accordance with a first direction, or arranged to surround the reference point R.

Then, the controller 400 of the vehicle may divide the concave region of the touch input device 200 into a plurality of subregions in accordance with the UI (610). Specifically, the controller 400 may divide the concave region in accordance with a method of arranging the objects I at the UI.

After the concave region is divided into the plurality of subregions, the pressure detector 300 may check whether pressure is detected (620). Here, the pressure detector 300 may detect the pressure transmitted through the concave region of the touch input device 200. If the pressure is not detected, checking whether the pressure is detected is repeated.

If the pressure is detected, a position of a touch which is detected in the touch input device 200 may be checked at the same time (630). As mentioned above, since an occupant presses the concave region of the touch input device 200 to transmit the pressure to the pressure detector 300, the occupant inevitably touches the touch input device 200. Consequently, the touch input device 200 may check the position of the touch occurring at a time when the pressure is detected.

After the position of the touch is checked, the controller 400 may check a subregion to which the checked position of the touch belongs (640). Since the controller 400 generates a control command which controls the UI for each subregion, the controller 400 checks the subregion in which the touch has occurred.

Then, the controller 400 generates a control command corresponding to the checked subregion (650). Here, the controller 400 may generate different control commands for each subregion at which the touch has occurred, and the different control commands may be implemented by different electrical signals.

Lastly, the display 34 may control the provided UI in accordance with the generated control command (660). For example, when the display 34 receives a control command which selects a currently activated object Ac, the display 34 may display a corresponding object I that has been selected.

According to a disclosed embodiment of a vehicle and control method thereof, since a UI is controlled based on a position of a touch regardless of a position at which pressure is applied, the UI can be controlled more accurately.

In addition, as a region in which a touch is detected is divided in accordance with a provided UI, an input environment optimized for various UIs can be provided to an occupant.

Although various embodiments of the present invention have been shown and described, it would be appreciated by those skilled in the art that changes may be made in these embodiments without departing from the principles and spirit of the invention, the scope of which is defined in the claims and their equivalents

What is claimed is:

1. A vehicle comprising:
    a touch input device including a touch screen display having a concave region for detecting a touch and providing a user interface (UI), the concave region being divided into a plurality of touch subregions in accordance with the UI and an edge portion;
    a pressure sensor configured to detect pressure; and
    a processor configured to control the concave region such that the UI is manipulated in accordance with a touch subregion in which the touch has been detected among the plurality of touch subregions when the pressure is detected by the pressure sensor to be equal to or greater than a value,
    wherein the processor is configured to divide, when an arrangement of the UI is changed, the concave region into the plurality of touch subregions corresponding to the changed arrangement of the UI,
    wherein the processor is configured to divide, when the UI provided by the concave region includes a plurality of objects arranged in a first direction, the concave region into the plurality of touch subregions by a boundary line in a second direction which is perpendicular to the first direction,
    wherein, in the touch input device, the concave region is divided into a first touch subregion in which a detected touch selects a currently activated object in the UI, a second touch subregion in which a detected touch activates an object disposed in the first direction from the currently activated object in the UI, and a third touch subregion in which a detected touch activates an object disposed in a direction opposite to the first direction from the currently activated object in the UI,
    wherein the concave region is divided into only three touch subregions,
    wherein the detected touch on the second touch subregion or the third touch subregion activates only an object immediately adjacent to the currently activated object in the UI,
    wherein a direction in which the first, second, and third touch subregions are arranged changes depending on a direction, among a plurality of directions, in which the plurality of objects in the UI are arranged, and
    wherein, in the touch input device, when the UI provided by the concave region includes a plurality of objects arranged to surround a reference point, the concave region is divided into the plurality of touch subregions by a secondary boundary line passing through a center of the concave region.

2. The vehicle according to claim 1, wherein the pressure sensor detects the pressure that is applied through the touch input device.

3. The vehicle according to claim 2, wherein the pressure sensor detects the pressure that is applied in a direction in which the concave region is formed in the touch input device.

4. The vehicle according to claim 1, wherein, in the touch input device, the concave region is divided into the plurality of touch subregions corresponding to an object arrangement of the UI provided by the concave region.

5. The vehicle according to claim 1, wherein the processor transmits, to the concave region, a control command corresponding to the touch subregion in which the touch has been detected.

6. The vehicle according to claim 5, wherein the concave region manipulates the UI in accordance with the received control command.

7. A control method of a vehicle which comprises a touch input device including a touch screen display having a concave region for detecting a touch and an edge portion, the control method comprising steps of:

providing a user interface (UI);

dividing the concave region of the touch screen display into a plurality of touch subregions in accordance with the UI;

detecting pressure;

detecting a touch in the concave region when the pressure is detected to be equal to or greater than a value; and manipulating the UI in accordance with a touch subregion in which the touch has been detected among the plurality of touch subregions, wherein the step of dividing the concave region comprises dividing, when an arrangement of the UI is changed, the concave region into the plurality of touch subregions corresponding to the changed arrangement of the UI, wherein, when the UI includes a plurality of objects arranged in a first direction, the step of dividing the concave region of the touch screen display into the plurality of touch subregions comprises dividing the concave region into the plurality of touch subregions by a boundary line in a second direction which is perpendicular to the first direction, wherein the step of dividing comprises dividing the concave region into a first touch subregion in which a detected touch selects a currently activated object in the UI, a second touch subregion in which a detected touch activates an object disposed in the first direction from the currently activated object in the UI, and a third touch subregion in which a detected touch activates an object disposed in a direction opposite to the first direction from the currently activated object in the UI, wherein the concave region is divided into only three touch subregions, wherein the detected touch on the second touch subregion or the third touch subregion activates only an object immediately adjacent to the currently activated object in the UI, wherein a direction in which the first, second, and third touch subregions are arranged changes depending on a direction, among a plurality of directions, in which the plurality of objects in the UI are arranged, and wherein, when the provided UI includes a plurality of objects arranged to surround a reference point, the step of dividing the concave region of the touch screen display into the plurality of touch subregions comprises dividing the concave region into the plurality of touch subregions by a secondary boundary line which passes through a center of the concave region.

8. The control method according to claim 7, wherein the step of detecting the pressure comprises detecting the pressure applied through the touch input device.

9. The control method according to claim 8, wherein the step of detecting the pressure comprises detecting the pressure applied in a direction in which the concave region is formed in the touch input device.

10. The control method according to claim 7, wherein the step of dividing the concave region of the touch screen display into the plurality of touch subregions comprises dividing the concave region into the plurality of touch subregions in accordance with an object arrangement of the provided UI.

11. The control method according to claim 7, wherein the step of manipulating the UI in accordance with the touch subregion in which the touch has been detected among the plurality of touch subregions comprises:

generating a control command corresponding to the touch subregion in which the touch has been detected; and manipulating the UI in accordance with the control command.

* * * * *